United States Patent [19]

Schaeffer et al.

[11] Patent Number: 4,602,732

[45] Date of Patent: Jul. 29, 1986

[54] METHOD OF SEALING AN ALUMINUM COVER TO A DRIP COFFEEMAKER HOT WATER GENERATOR ALUMINUM CASTING

[75] Inventors: Robert L. Schaeffer, Columbia Cross Roads, Pa.; Edward L. Latos, Virginia Beach, Va.

[73] Assignee: Black & Decker, Inc., Del.

[21] Appl. No.: 657,348

[22] Filed: Oct. 3, 1984

[51] Int. Cl.[4] .............................................. B23K 31/00
[52] U.S. Cl. .................................. 228/125; 228/173.2
[58] Field of Search ..................... 228/125, 173.2, 115; 219/128

[56] References Cited

U.S. PATENT DOCUMENTS 2,712,249  7/1955  Siegerist ............................... 228/125

FOREIGN PATENT DOCUMENTS 57-14478  1/1982  Japan ................................... 228/125

Primary Examiner—Nicholas P. Godici
Assistant Examiner—Karen Skillman
Attorney, Agent, or Firm—Leonard J. Platt

[57] ABSTRACT

The method of joining and sealing a wrought aluminum hot water generator with the cover and the die casting forming walls of a hot water channel wherein a weld bead is laid on top of and between the cover and the die casting. The weld bead is then compressed by a flat steel plate to squeeze out any small pockets of gas that could destroy the water tight integrity of the weld.

5 Claims, 5 Drawing Figures

METHOD OF SEALING AN ALUMINUM COVER TO A DRIP COFFEEMAKER HOT WATER GENERATOR ALUMINUM CASTING

BACKGROUND OF THE INVENTION 1. Field of the Invention

This invention relates to an electric drip coffeemaker hot water generator and, more particularly, to an improved method of joining and sealing a wrought aluminum cover to a diecast aluminum hot water generator.

2. Description of the Prior Art and Cross Reference to a Related Application

In a co-pending application of Robert L. Schaeffer, Ser. No. 06/657,349, filed Oct. 3, 1984, now U.S. Pat. No. 4,546,697 and assigned to the same assignee as the present invention, there is disclosed a hot water generator for an electric drip coffeemaker. The hot water generator includes an aluminum die casting having a "U" shaped hot water channel with the bottom and side walls of the hot water channel formed in the casting. A generally "U" shaped aluminum cover is positioned on top of the casting for forming the top wall of the "U" shaped hot water channel.

Automatic welding of any type is not normally used as a suitable joining method for aluminum die castings and wrought aluminum particularly when a water tight seal is required. Die castings present a problem in welding because small pockets of gas are trapped in the metal during the casting process and when the metal fuses during welding, these pockets expand and migrate through the weld. This porosity can be connected and thus the weld is not sealed. In extreme cases where a relatively large pocket of gas exists, it can even blow a hole completely through the weld, thus creating a major leak. It is very desirable to be able to automatically weld a wrought aluminum cover to a drip coffeemaker hot water generator aluminum die casting in a high speed automatic manufacturing process.

SUMMARY OF THE INVENTION

Accordingly, it is a particular object of our invention to provide an improved method for automatically welding a wrought aluminum cover to a die cast aluminum hot water generator which effectively seals the cover to the die casting so that it will not leak water while water is being heated for brewing coffee.

It is also an object of our invention to provide an improved welding operation which is simple, fast and can be performed with conventional manufacturing equipment.

In accordance with the invention a hot water generator is die cast from aluminum to include a water channel with side walls extending upwardly and with the top of the side walls having a flat portion and a raised lip to form a recess for receiving a generally flat wrought aluminum cover. The cover is automatically welded to the wrought aluminum die casting with a welding bead formed on top of and between the edges of the wrought aluminum cover and the die casting. A hydraulic press with a flat steel plate is used to flatten and compress the upwardly extending weld bead to squeeze out any small pockets of gas that may be trapped in the weld bead and the die casting in the vicinity of the weld.

With this construction we have found that with metal inert gas welding, the weld bead is relatively ductile and compressing the weld closes off the porosity within the weld and provides a water tight seal without damaging the structural integrity of the weld.

Accordingly, by uniquely adding a planishing step to the manufacturing process after a weld has been automatically forced, automatic welding equipment may be used for welding a wrought aluminum cover to a die cast aluminum hot water generator to form an effective water tight seal between the wrought aluminum cover and the die cast aluminum hot water generator. Thus, more expensive ways to reduce the porosity of a weld by quenching using fillers or other known higher cost techniques have been obviated.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
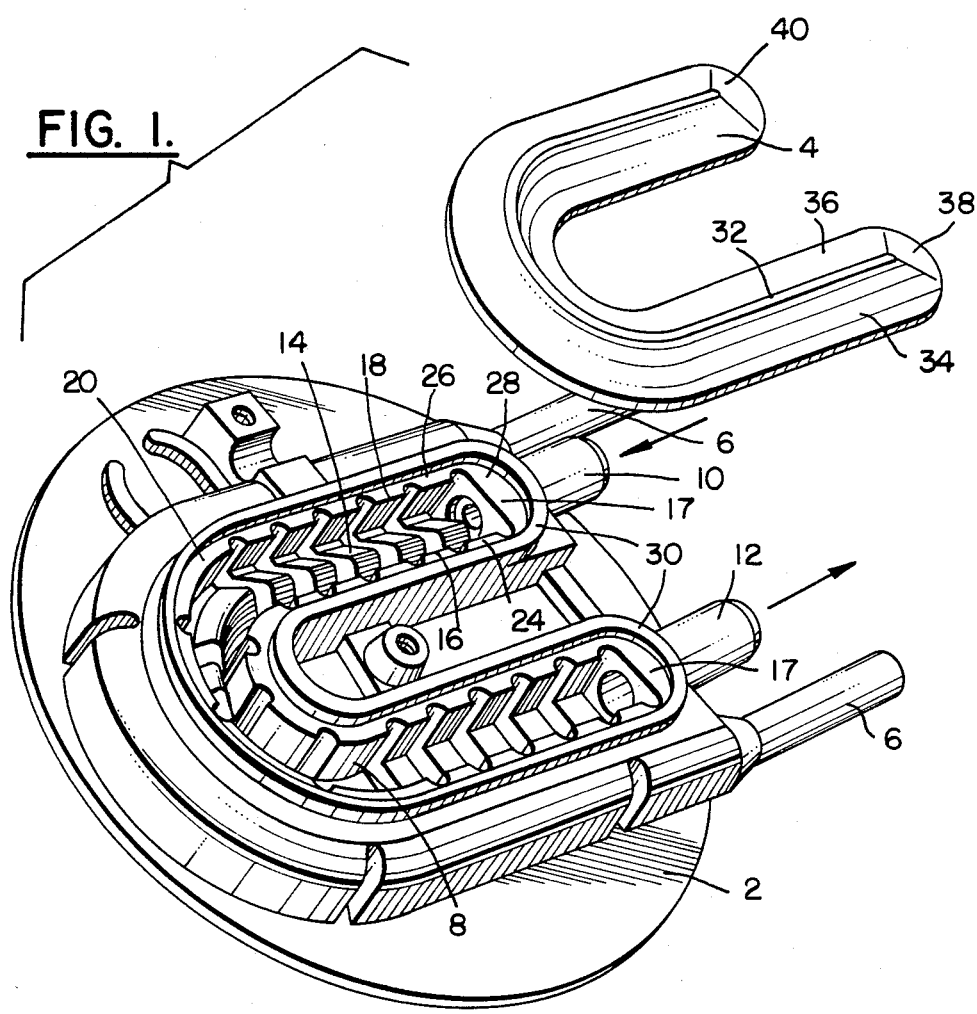
FIG. 1 is an exploded perspective view of a hot water generator for a drip coffeemaker with a wrought aluminum cover for the water channel being shown separated from the casting.

Referring now to the drawing and first particularly to FIG. 1, there is shown a hot water generator for an electric drip coffeemaker including an aluminum die casting 2 and a cover 4 which may be welded to the die-casting 2 and a cover 4 which may be welded to the die casting using our unique method of joining and sealing a wrought aluminum cover to an aluminum die casting.

Figure 3:
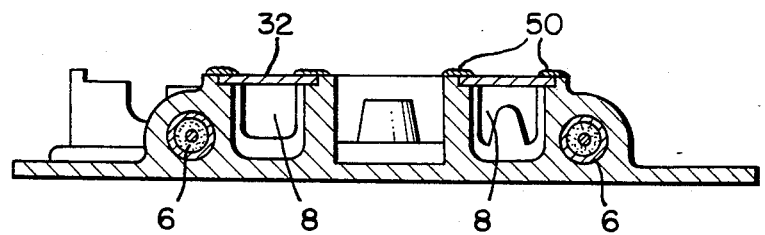
FIG. 3 is a cross sectional view on line 3—3 of FIG. 2 with the wrought aluminum cover positioned on top of and welded to the aluminum die casting.
Figure 2:
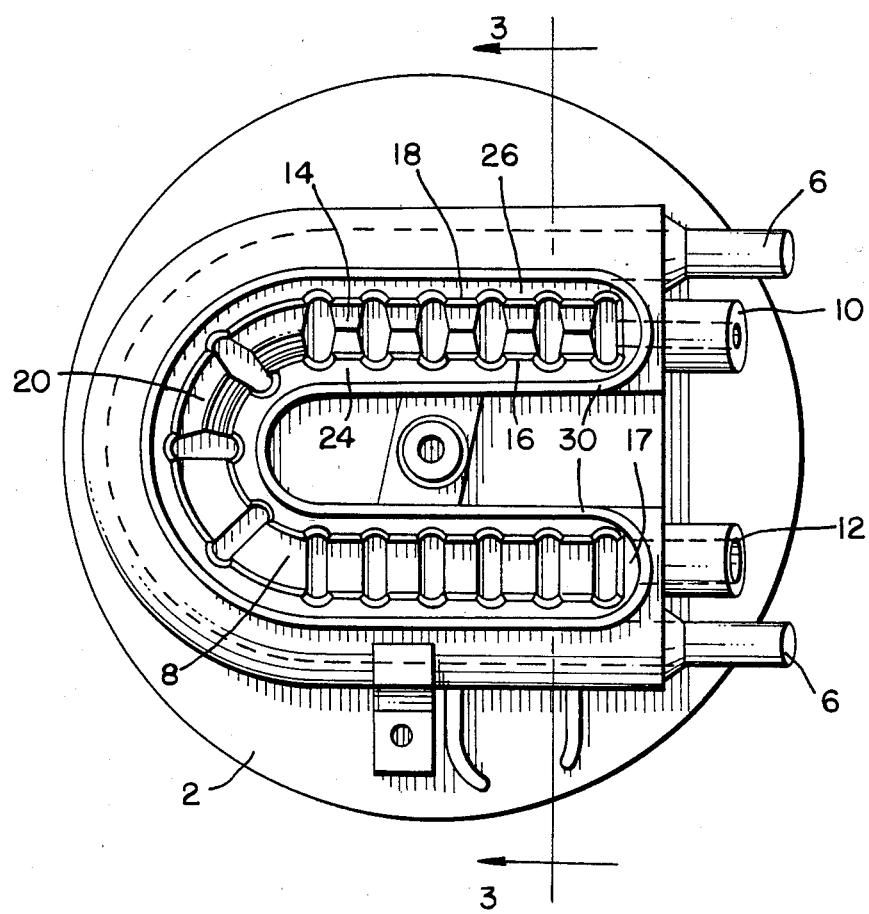
FIG. 2 is a top view of the hot water generator shown in FIG. 1 with the cover removed.

As shown from the perspective view of FIG. 1 and the cross sectional view of FIG. 3, a sheathed electric heating element 6 may be cast into the aluminum die casting for heating water which flows through a water channel 8. The water channel is generally "U" shaped and the hot water generator is provided with a water inlet nipple 10 and an outlet nipple 12 which may be integrally formed in the aluminum die casting. As shown, the water channel 8 provided in the casting includes a bottom wall 14 along with an inside wall 16, an outside wall 18, and end walls 17.

The details of the bottom wall of the water channel and the hot water generator do not form a part of this invention and are described and illustrated in greater detail in the afore mentioned co-pending application to Robert L. Schaeffer, assigned to the same assignee as the present invention.

As shown in FIG. 1, a recess 20 is formed at the top of the side and end walls 16, 17 and 18 of the aluminum die casting for receiving the wrought aluminum cover 4. As shown the top of the side walls 16 and 18 and the top of the end wall 17 include generally flat portions 24, 26 and 28, respectively, and a raised lip 30 to form the recess 20 between the flat portions 24, 26, 28 and the raised lip 30.

Figure 4:
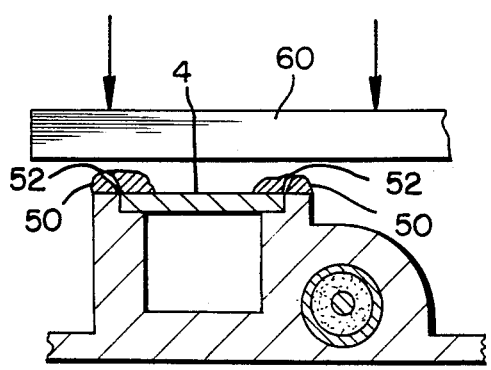
FIG. 4 is a partial cross sectional view also on line 3—3 of FIG. 2 showing the wrought aluminum cover welded to the die casting with porosity in the welded joint.

The wrought aluminum cover is shaped so that the edges may be compressed against the raised lip 30. As shown in FIG. 1, the generally flat wrought aluminum cover is somewhat deformed to include a raised central portion 32 with depending side portions 34 and 36 and depending end portions 38 and 40. The next step is to place the somewhat deformed wrought aluminum cover 4 within the recess formed by the lip 30 and the flat portions 24, 26 and 28. Then the wrought aluminum cover is press fitted into the recess with an interference fit to hold the cover in the recess during welding. Then the cover may be placed under a suitable automated welding machine of the metal inert gas type and in a conventional manner, a weld bead 50 may be laid on the aluminum die casting 2 and cover 4. As diagramatically shown in a rather exaggerated manner in FIG. 4, small pockets of gas 52 that are trapped in the aluminum die casting during the casting process may migrate through the weld bead 50 during the welding operation. This porosity can be connected as illustrated, and thus the weld does not provide a water tight seal.

Figure 5:
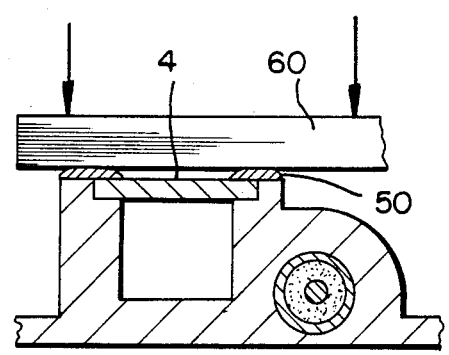
FIG. 5 is a cross sectional view also on line 3—3 of FIG. 2 showing the wrought aluminum cover welded to the die casting after the welding bead has been flattened to squeeze out any small pockets of gas that would affect the water tight integrity of the weld and the die casting in the vicinity of the weld.

In accordance with our invention, in order to seal the welded joint including the weld bead 50 and any adjacent areas 52 of the aluminum die casting, the weld bead is compressed under a metal press to flatten the weld bead 50. In the embodiment illustrated in FIGS. 4 and 5, a suitable hydraulic press may include a flat steel plate 60 which is automatically placed on top of the weld bead 50 and operated to perform a compressing action on the top of the weld bead. This flattens the weld bead to squeeze out any small pockets of gas that may be trapped in the weld bead and the die casting in the vicinity of the weld. With reference to the diagrammatic views of FIG. 4 and FIG. 5 it can be seen that compression will flatten the top of the weld bead and eliminate the porosities. Thus, the cover is sealed to the aluminum die casting.

It has been found that the optimum parameters for compression sealing the weld after it has been laid occurs when the flat steel plate in the hydraulic press is applied at a force of 60,000 lbs. to compress the weld bead to a height of approximately 0.040 inch above the upper surface of the raised lip 30 with the application of the hydraulic pressure taking place during a time period of between 1 and 2 seconds.

With this improved welding and weld sealing method it can be appreciated that an improved low cost water tight seal may be provided using relatively low cost conventional automatic welding and pressing equipment. After a simple assembling operation in which the wrought aluminum cover is placed on the aluminum die casting, conventional metal inert gas automatic welding equipment can be used to form a weld bead and the relatively ductile weld bead may be readily sealed in a hydraulic pressing operation. All of the manufacturing equipment may be arranged in a high speed mass production operation. Thus, an improved sealed weld has been achieved at relatively low manufacturing cost.

What we claim is:

1. The method of joining and sealing a wrought aluminum cover to a die cast aluminum hot water generator with the cover and the die casting forming walls of a hot water channel consisting:
   a. stamping and shaping a wrought aluminum cover;
   b. die casting an aluminum hot water generator to include a water channel with side walls extending upwardly with the top of the side walls having a flat portion for receiving said wrought aluminum cover;
   c. placing said wrought aluminum cover on top of the side walls;
   d. welding a metal bead on top of and between the said wrought aluminum cover and said die casting and;
   hydraulicly pressing in a single stroke a flat steel plate on top of said weld bead while said weld bead remains ductile to flatten and compress the weld bead to squeeze out any small pockets of gas that may be trapped in the weld bead and the die casting in the vicinity of the weld to thereby seal the cover to the die casting.

2. The method according to claim 1 wherein the pressure applied to said weld bead is at least 50,000 lbs.

3. The method of joining and sealing a wrought aluminum cover to a die cast aluminum hot water generator with the cover and the die casting forming walls of a hot water channel consisting:
   a. stamping and shaping a wrought aluminum cover;
   b. die casting an aluminum hot water generator to include a water channel with side walls extending upwardly with the top of the side walls having a flat portion and a raised lip to form a recess for receiving said wrought aluminum cover;
   c. placing said wrought aluminum cover in the recess on top of the side walls;
   d. welding a metal bead on top of and between the edges of said wrought aluminum cover and said die casting and;
   hydraulicly pressing in a single stroke a flat steel plate on top of said weld bead while said weld bead remains ductile to flatten and compress the weld bead to squeeze out any small pockets of gas that may be trapped in the weld bead and the die casting in the vicinity of the weld to thereby provide a water tight seal between the cover and the die casting.

4. The method according to claim 3 wherein the weld bead is compressed to a height of 0.040 inch above the surface of the raised lip.

5. The method of joining and sealing a wrought aluminum cover to a die cast aluminum hot water generator with the cover and the die casting forming walls of a hot water channel consisting:
   a. stamping and shaping a generally flat "U" shaped wrought aluminum cover;
   b. die casting an aluminum hot water generator to include a "U" shaped water channel with side walls extending upwardly with the top of the side walls including a flat generally horizontal portion and a raised upwardly extending lip to form a "U" shaped recess for receiving said "U" shaped wrought aluminum cover;
   c. placing said wrought aluminum cover in the "U" shaped recess on top of the side walls;
   d. welding a metal bead on top of and between the edges of said wrought aluminum cover and said die casting and;
   e. hydraulicly pressing in a single stroke a flat steel plate on top of said weld bead while said weld bead remains ductile to flatten and compress the weld bead to squeeze out any small pockets of gas that may be trapped in the weld bead and the die casting in the vicinity of the weld to thereby provide a water tight seal between the cover and the die casting.

* * * * *